(12) United States Patent
Shin et al.

(10) Patent No.: US 11,612,172 B2
(45) Date of Patent: Mar. 28, 2023

(54) PROCESSED PRODUCTS OF TEA WITH QUICK DISPERSIBILITY IN WATER AND METHOD FOR MANUFACTURING PROCESSED PRODUCTS OF TEA

(71) Applicant: AMOREPACIFIC CORPORATION, Seoul (KR)

(72) Inventors: Kwanghyun Shin, Yongin-si (KR); Wonkyung Cho, Yongin-si (KR); Jinoh Chung, Yongin-si (KR); Yong Deog Hong, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 343 days.

(21) Appl. No.: 16/664,272

(22) Filed: Oct. 25, 2019

(65) Prior Publication Data
US 2020/0128843 A1    Apr. 30, 2020

(30) Foreign Application Priority Data

Oct. 25, 2018 (KR) .......................... 10-2018-0128236
Oct. 25, 2018 (KR) .......................... 10-2018-0128237
Jun. 28, 2019 (KR) .......................... 10-2019-0077830

(51) Int. Cl.
*A23F 3/32* (2006.01)
*A23F 3/14* (2006.01)
*A23L 19/00* (2016.01)

(52) U.S. Cl.
CPC .................. *A23F 3/32* (2013.01); *A23F 3/14* (2013.01); *A23L 19/01* (2016.08)

(58) Field of Classification Search
CPC ............... A23F 3/14; A23F 3/32; A23L 19/01
See application file for complete search history.

(56) References Cited

U.S. PATENT DOCUMENTS 4,076,847 A * 2/1978 Johnson .................... A23F 5/46
                                                       426/597
6,056,949 A   5/2000 Menzi et al.
(Continued)

FOREIGN PATENT DOCUMENTS

CA        2603002 A      10/2006
CN      104055119      *  9/2014
(Continued)

OTHER PUBLICATIONS

Translation for CN106665944 published May 2017.*
(Continued)

*Primary Examiner* — Anthony J Weier
(74) *Attorney, Agent, or Firm* — Merchant & Gould P.C.

(57) ABSTRACT

The present disclosure shows a particulate processed product of tea with quick dispersibility in water and a method for manufacturing a particulate processed product of tea. The processed product of tea comprises 20% by weight or less of fine powders having a particle diameter of 75 μm or less based on the total weight of the tea particles. The manufacturing method comprises the step of manufacturing tea particles using a fluid-bed rotor granulator having a rotor disc. The processed product of tea has quick wettability and dispersibility in water and thus is easy to drink. Also, the processed product of tea has a low angle of repose and thus has excellent flowability, so that it is easy to pack and use.

20 Claims, 9 Drawing Sheets

(56) References Cited

U.S. PATENT DOCUMENTS

| | | | |
|---|---|---|---|
| 6,287,616 B1 | 9/2001 | Beeson et al. | |
| 2006/0062886 A1* | 3/2006 | Takeda | A23F 3/30 |
| | | | 426/597 |
| 2017/0028032 A1 | 2/2017 | Kitahara et al. | |
| 2018/0339008 A1 | 11/2018 | Yoon et al. | |
| 2021/0051972 A1 | 2/2021 | Shin et al. | |

FOREIGN PATENT DOCUMENTS

| | | | |
|---|---|---|---|
| CN | 105767397 | * | 7/2016 |
| CN | 106665944 | * | 5/2017 |
| CN | 201064162 Y | | 5/2018 |
| GB | 1301770 A | | 1/1973 |
| JP | 2003-250491 A | | 9/2003 |
| JP | 2006-191845 A | | 7/2006 |
| JP | 2006-288350 A | | 10/2006 |
| JP | 2006-296341 A | | 11/2006 |
| JP | 2008-5703 A | | 1/2008 |
| JP | 2013-209493 A | | 10/2013 |
| JP | 2016-146780 A | | 8/2016 |
| JP | 2019-041660 A | | 3/2019 |
| JP | 2019-129717 A | | 8/2019 |
| KR | 0143385 B1 | | 7/1998 |
| KR | 10-0303169 B1 | | 7/2001 |
| KR | 10-0437724 B1 | | 6/2004 |
| KR | 20060061784 A | | 6/2006 |
| KR | 10-2006-0090894 A | | 8/2006 |
| KR | 10-2007-0074702 A | | 7/2007 |
| KR | 10-0776018 B1 | | 11/2007 |
| KR | 10-0797974 B1 | | 1/2008 |
| KR | 20080090808 A | | 10/2008 |
| KR | 10-0899334 B1 | | 5/2009 |
| KR | 10-1311743 B1 | | 9/2013 |
| KR | 10-2013-0142419 A | | 12/2013 |
| KR | 10-2016-0017978 A | | 2/2016 |
| KR | 10-2016-0144418 A | | 12/2016 |
| KR | 10-1689436 B1 | | 12/2016 |
| KR | 10-1691919 B1 | | 12/2016 |
| KR | 10-1691919 B1 | | 1/2017 |
| KR | 10-1694707 B1 | | 1/2017 |
| KR | 10-1758346 B1 | | 7/2017 |
| WO | 2006/085710 A1 | | 8/2006 |
| WO | 2007/081158 A1 | | 7/2007 |

OTHER PUBLICATIONS

Sphericity—Wikipedia. Feb. 2022; https://en.wikipedia.org/wiki/Sphericity.

Arasan et al., "The Relationship between the Angle of Repose and Shape Properties of Granular Materials using Image Analysis" 2022.

Neuwirth et al., CFD-DEM study and direct measurement of the granular flow in a rotor granulator'; Chemical Engineeing Seicence, 2013 vol. 86: 151-163.

Office Action for Japanese Patent Application No. 2019-193071 (dated Jan. 31, 2023).

* cited by examiner

PROCESSED PRODUCTS OF TEA WITH QUICK DISPERSIBILITY IN WATER AND METHOD FOR MANUFACTURING PROCESSED PRODUCTS OF TEA

CROSS-REFERENCE TO RELATED APPLICATION

This application claims priority to and the benefit of Korean Patent Application No. 10-2018-0128236, filed on Oct. 25, 2018, Korean Patent Application No. 10-2018-0128237, filed on Oct. 25, 2018, and Korean Patent Application No. 10-2019-0077830, filed on Jun. 28, 2019, according to 35 U.S.C. § 119, and the disclosures of these patent applications are incorporated herein by reference in their entirety.

BACKGROUND OF THE INVENTION

Field of the Invention

The present disclosure discloses a particulate processed product of tea with quick dispersibility in water and a method for manufacturing a particulate processed product of tea.

Description of the Related Art

When green tea is brewed with water, water-soluble ingredients contained in the green tea will be drunk and the remainder will be discarded. In contrast, powdered green tea has an advantage in that all the ingredients of the green tea, for example, tocopherol, vitamin A, dietary fiber, etc., can be ingested. Thus, powdered green tea allows to ingest much more amount of useful ingredients than full leaf green tea, which is to be brewed with hot water. However, in order to take powdered green tea, it is necessary to use tea utensils or a teapot, etc. Also, powdered green tea has low dispersibility due to the cohesive force between the particles, which leads to time consumption and inconvenience. Recently, many powdered green tea products on the market are contained in a disposable stick pack to help consumers to put powdered green tea in a water bottle or a tumbler and drink the tea. However, these products still have the problem that when they are put in water, they agglomerate and thus are not easily dispersed, so that consumers have to shake them for a considerable time before drinking them. Further, in the case of stick pack products (for example, Rishi Matcha Travel Packs, Rishi-Tea, USA) in which a small amount of powdered green tea is packaged, it is difficult to put powdered green tea in the same quantity due to the low fluidity of the powders, and there is a high probability of occurrence of defects during sealing due to fine powders.

SUMMARY OF THE INVENTION

In one aspect, an object of the present disclosure is to provide a particulate processed product of tea with quick wettability and dispersibility in water.

In another aspect, an object of the present disclosure is to provide a method for manufacturing a particulate processed product of tea with quick wettability and dispersibility in water.

In one aspect, the technology disclosed herein provides a particulate processed product of tea comprising 20% by weight or less of fine powders based on the total weight of the tea particles, wherein the fine powders have a particle diameter of 75 μm or less.

In one exemplary embodiment, the tea may be tea leaves.

In one exemplary embodiment, the tea may be one or more selected from the group consisting of unfermented tea, semi-fermented tea, fermented tea and post-fermented tea.

In one exemplary embodiment, the tea may be green tea.

In one exemplary embodiment, the processed product of tea may comprise 15% by weight or less of fine powders based on the total weight of the tea particles In one exemplary embodiment, the tea particles may have one or more of the following particle size distribution values i) to iii):

i) a particle size distribution $D_{10}$ of 50 μm or more;
 ii) a particle size distribution $D_{50}$ of 100 μm or more; and
 iii) a particle size distribution $D_{90}$ of 200 μm or more,
 wherein, in the above i) to iii), $D_{10}$, $D_{50}$, and $D_{90}$ respectively refer to a particle diameter corresponding to cumulative size distribution at 10%, a median diameter and a particle diameter corresponding to cumulative size distribution at 90%.

In one exemplary embodiment, the particle size distribution $D_{10}$ may be 50 μm≤$D_{10}$≤200 μm, the particle size distribution $D_{50}$ may be 100 μm≤$D_{50}$≤250 μm, and the particle size distribution $D_{90}$ may be 200 μm≤$D_{90}$≤600 μm.

In one exemplary embodiment, the average particle diameter of the total tea particles may be 100 to 300 μm.

In one exemplary embodiment, the processed product of tea may have an angle of repose of 35° or less.

In one exemplary embodiment, the processed product of tea may have a wetting time of 60 seconds or less when contacted with water.

In one exemplary embodiment, the wetting time may be the time it takes for the whole processed product of tea to sink below water surface when 1.5 g of the processed product of tea is placed on the water surface.

In one exemplary embodiment, the processed product of tea may have a formulation of fine granules or powders.

In another aspect, the technology disclosed herein provides a method for manufacturing a particulate processed product of tea, comprising the step of manufacturing tea particles using a fluid-bed rotor granulator comprising a rotor disc.

In one exemplary embodiment, the manufacturing method may comprise the steps of: placing tea powders on the rotor disc and rotating the rotor disc; supplying air to levitate the tea powders; and spraying water onto the levitated tea powders to bring the tea powders into contact with water.

In one exemplary embodiment, particle diameters of the tea powders constituting 99% by weight or more of the total weight of the tea powders may be 75 μm or less.

In one exemplary embodiment, the manufacturing method may be spraying onto the tea powders water in an amount 0.3 to 1.5 times the total weight of the tea powders.

In one exemplary embodiment, the fluid-bed rotor granulator may comprise a container; a rotor disc formed within the container; a gap forming part for supplying air into the container; and a nozzle forming part for spraying water into the container.

In one exemplary embodiment, the rotor disc may manufacture tea particles at a tip speed of 2 to 20 m/sec.

In one exemplary embodiment, the fluid-bed rotor granulator may manufacture tea particles under one or more of the following conditions: an inlet air temperature of 15° C. to 40° C., an exhaust temperature of 10° C. to 35° C., a spray nozzle diameter of 1.0 to 2.0 mm, a spray pressure of 1.0 to 5.0 bar, and a drying temperature of 40° C. to 80° C.

In one exemplary embodiment, the processed product of tea manufactured by the manufacturing method may have one or more of the following properties:
- a) the processed product of tea comprises 20% by weight or less of fine powders based on the total weight of the tea particles, the fine powders having a particle diameter of 75 μm or less;
- b) the tea particles have one or more of the following particle size distribution values i) to iii):
  i) a particle size distribution $D_{10}$ of 50 μm or more;
  ii) a particle size distribution $D_{50}$ of 100 μm or more; and
  iii) a particle size distribution $D_{90}$ of 200 μm or more,
  wherein, in the above i) to iii), $D_{10}$, $D_{50}$, and $D_{90}$ respectively refer to a particle diameter corresponding to cumulative size distribution at 10%, a median diameter and a particle diameter corresponding to cumulative size distribution at 90%;
- c) the average particle diameter of the total tea particles is 100 to 300 μm;
- d) the processed product of tea has an angle of repose of 35° or less; and
- e) the processed product of tea has a wetting time of 60 seconds or less when contacted with water.

In one aspect, the technology disclosed herein has the effect of providing particulate processed products of tea with quick wettability and dispersibility in water.

In another aspect, the technology disclosed herein has the effect of providing a method for manufacturing particulate processed products of tea with quick wettability and dispersibility in water.

The processed products of tea according to the present disclosure have quick wettability and dispersibility in water and thus are easy to drink. Also, the processed products of tea have a low angle of repose and thus have an excellent flowability, so that they are easy to pack and use.

BRIEF DESCRIPTION OF THE DRAWINGS

FIG. 4 shows the test result of Comparative Example 1, FIG. 5 shows that of Comparative Example 4, FIG. 6 shows that of Comparative Example 5, FIG. 7 shows that of Comparative Example 6, and FIG. 8 shows that of Comparative Example 7;

DETAILED DESCRIPTION OF THE PREFERRED EMBODIMENTS

Figure 1:
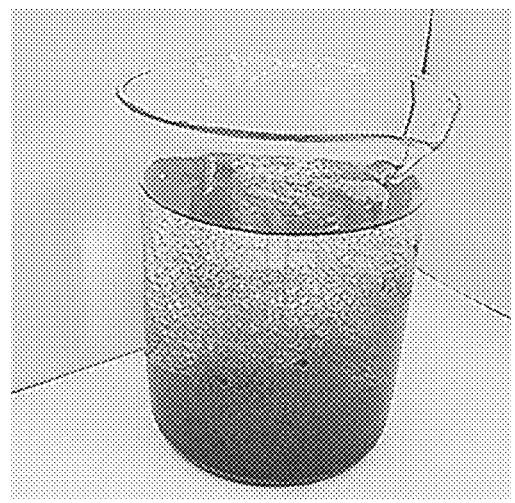
FIG. 1 is a photograph showing the visual observation of a processed product of tea dispersed in water, immediately after measuring the wetting time (13 seconds) after putting the sample of Example 2 in water according to a test example of the present disclosure.
Figure 2:
FIG. 2 is a photograph showing the visual observation of a processed product of tea dispersed in water, immediately after measuring the wetting time (11 seconds) after putting the sample of Example 3 in water according to a test example of the present disclosure.
Figure 3:
FIG. 3 is a photograph showing the visual observation of a processed product of tea dispersed in water, immediately after measuring the wetting time (23 seconds) after putting the sample of Example 4 in water according to a test example of the present disclosure.

Hereinafter, the technology disclosed herein will be described in detail.

In one aspect, the technology disclosed herein provides a particulate processed product of tea comprising 20% by weight or less of fine powders based on the total weight of the tea particles, wherein the fine powders have a particle diameter of 75 μm or less.

In another aspect, the technology disclosed herein provides a method for manufacturing a particulate processed product of tea, comprising the step of manufacturing tea particles using a fluid-bed rotor granulator comprising a rotor disc.

The particulate processed product of tea according to the present disclosure refers to a processed product of tea in the form of particles. The processed product of tea may be in the form of particles formed by agglomeration of a plurality of tea powders. For example, the processed product of tea may include tea particles formed by agglomeration of a plurality of tea powders caused by addition of water to the tea powders. When moisture is added to the dry fine powders, the powder ingredients are made to have adhesiveness, which causes them to agglomerate with each other, thereby forming particles about 10 to 150 times larger than the powders. Those obtained by drying these particles may be referred to as fine granules or granules. Generally, the powders are finely granulated or granulated to improve flowability and preservability, etc.

In one exemplary embodiment, the term particulate may refer to, for example, amorphous, spherical, elliptical, or rectangular, etc.

As used herein, the term tea powders refers to powders obtained from *Camellia sinensis* as a raw material. For example, it may refer to powders obtained by pulverizing, crushing or milling tea leaves, or powders obtained by making powders from an extract or an extract liquid of tea leaves through a process such as spray drying, etc. The tea leaves can be used without being limited by harvesting time, the presence or absence of processing or a processing method.

In one exemplary embodiment, the tea powders may be obtained using a pulverization device. Pulverization devices can be broadly classified into crushers, grinders, etc. A crusher is a device for pulverizing large chunks of solid, and examples thereof include a jaw crusher, a gyratory crusher, etc. A grinder is a device for making the powders first pulverized in a crusher into smaller pulverized products, or for manufacturing fine powders without primary pulverization. Examples thereof include a hammer mill, a roller mill, a ball mill, an attrition mill, an air-flow type mill, etc. In the case of manufacturing powdered green tea by pulverizing the leaves of Camellia sinensis, the aforementioned pulverization devices, in particular, an electric millstone, a ball mill, a hammer mill, etc. are used.

In one exemplary embodiment, the tea powders may have a particle diameter of 50 μm or less, or 1 to 50 μm, or 10 to 50 μm.

In one exemplary embodiment, particle diameters of the tea powders constituting 99% by weight or more of the total weight of the tea powders may be 75 μm or less.

In one exemplary embodiment, the processed product of tea is formed from tea powders, and may be composed of 100% of tea powders without an additive. In another exemplary embodiment, the processed product of tea may be composed of 90% by weight or more or 95% by weight or more of tea powders based on the total weight of the processed product.

In one exemplary embodiment, the tea may be tea leaves.

In one exemplary embodiment, the tea may be one or more selected from the group comprising unfermented tea such as green tea, fermented tea such as black tea, semi-fermented tea such as oolong tea, white tea, and flower tea, and post-fermented tea such as puer tea and yellow tea.

In one exemplary embodiment, the tea may be green tea.

In one exemplary embodiment, the tea may be green tea leaves.

The processed product of tea according to the present disclosure has excellent wettability and dispersibility (spreadability of particles). The present disclosure provides a processed product of tea having so rapid a dispersion rate that a conventional process of stirring or shaking to disperse powdered green tea or powdered green tea granules in water is not necessary. The processed product of tea has excellent redispersibility, and thus does not stick to or agglomerate with each other after dispersed in water, and maintains a dispersed state over time. The processed product of tea exhibits excellent dispersibility and redispersibility in both cold and hot water regardless of the temperature of the water.

Also, the processed product of tea according to the present disclosure has the advantage of excellent flowability or fluidity. Thus, the processed product of tea is easy to pack, so that it offers advantages in manufacturing processes such as filling and sealing, when packed as a stick (for example, it is easy to pack in the same quantity and prevents defects that may occur during sealing). Further, it is convenient for consumers to use it because it allows to easily discharge the particles.

The method for manufacturing a processed product of tea according to the present disclosure has the effect of providing a particulate processed product of tea with quick wettability and dispersibility in water and excellent fluidity, by manufacturing tea particles using a fluid-bed rotor granulator comprising a rotor disc. In one exemplary embodiment, the manufacturing method allows to manufacture tea particles with excellent dispersibility and flowability only with tea powders and water without using an additive.

As used herein, the fine powders refer to particles having a tea particle size, that is, a particle diameter (also referred to as grain diameter), of 75 μm (200 mesh) or less.

As used herein, the particle diameter may refer to the longest diameter of a particle.

In one exemplary embodiment, the processed product of tea may comprise 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4% by weight or less, 3% by weight or less, 2% by weight or less, or 1% by weight or less of fine powders based on the total weight of the tea particles. In another exemplary embodiment, the processed product of tea may not comprise fine powders, or may comprise 0.0001 to 20% by weight, 0.001 to 20% by weight, 0.01 to 20% by weight, 0.05 to 20% by weight, or 0.1 to 20% by weight of fine powders based on the total weight of the tea particles. Here, the total weight of tea particles may refer to the total weight of a processed product of tea.

In one exemplary embodiment, the tea particles may have one or more of the following particle size distribution values i) to iii), and here, the tea particles may refer to a processed product of tea:
  i) a particle size distribution $D_{10}$ of 50 μm or more;
  ii) a particle size distribution $D_{50}$ of 100 μm or more; and
  iii) a particle size distribution $D_{90}$ of 200 μm or more,
wherein, in the above i) to iii), $D_{10}$, $D_{50}$, and $D_{90}$ respectively mean a diameter of the particle corresponding to 10%, 50%, and 90% from below of accumulation in particle diameter-based cumulative distribution of tea particles.

In one exemplary embodiment, the particle size distribution $D_{10}$ may be 50 μm or more, 60 μm or more, 70 μm or more, 80 μm or more, 90 μm or more, or 100 μm or more, and 200 μm or less, 190 μm or less, 180 μm or less, 170 μm or less, 160 μm or less, 150 μm or less, 140 μm or less, 130 μm or less, 120 μm or less, 110 μm or less, or 100 μm or less.

In one exemplary embodiment, the particle size distribution $D_{50}$ may be 100 μm or more, 110 μm or more, 120 μm or more, 130 μm or more, 140 μm or more, or 150 μm or more, and 250 μm or less, 240 μm or less, 230 μm or less, 220 μm or less, 210 μm or less, or 200 μm or less.

In one exemplary embodiment, the particle size distribution $D_{90}$ may be 200 μm or more, 220 μm or more, 240 μm or more, 260 μm or more, 280 μm or more, or 300 μm or more, and 600 μm or less, 550 μm or less, 500 μm or less, 450 μm or less, 400 μm or less, 350 μm or less, 340 μm or less, 330 μm or less, 320 μm or less, 310 μm or less, or 300 μm or less.

In one exemplary embodiment, the particle size distribution $D_{10}$ may be 50 μm≤$D_{10}$≤200 μm, the particle size distribution $D_{50}$ may be 100 μm ≤$D_{50}$≤250 μm, and the particle size distribution $D_{90}$ may be 200 μm≤$D_{90}$≤600 μm.

In one exemplary embodiment, the average particle diameter of the total tea particles may be 100 to 300 μm. Here, the tea particles may refer to a processed product of tea. In another exemplary embodiment, the average particle diameter of the total tea particles may be 100 μm or more, 110 μm or more, 120 μm or more, 130 μm or more, 140 μm or more, 150 μm or more, 160 μm or more, 170 μm or more, 180 μm or more, 190 μm or more, or 200 pm or more, and 300 μm or less, 290 μm or less, 280 μm or less, 270 μm or less, 260 μm or less, 250 μm or less, 240 μm or less, 230 μm or less, 220 μm or less, 210 μm or less, or 200 μm or less.

In one exemplary embodiment, the processed product of tea has an angle of repose of 35° or less, preferably, an angle of repose of 30° or less, and thus has excellent flowability and fluidity, so that it is easy to pack and use. The angle of repose refers to the angle at which piled tea particles can be maintained stably. The higher the angle of repose is, the lower the fluidity is.

In one exemplary embodiment, the processed product of tea may have a wetting time of 60 seconds or less, 50 seconds or less, 40 seconds or less, 30 seconds or less, 20 seconds or less, or 10 seconds or less, when contacted with water.

In one exemplary embodiment, the wetting time may be the time it takes for the whole processed product of tea to sink below water surface when 1.5 g of the processed product of tea is placed on the water surface. That is, the wetting time may refer to the time it takes for the whole processed product of tea to be immersed in water when 1.5 g of the processed product of tea is left on the water surface without any physical or chemical treatment. In one exemplary embodiment, the amount of water may be 500 mL.

In another exemplary embodiment, the wetting time may be the time it takes for the whole processed product of tea to sink below water surface when 1.5 g of the processed product of tea is placed on the water surface at 15 to 25° C., under room temperature.

In one exemplary embodiment, the processed product of tea may have a formulation of fine granules or powders.

In one exemplary embodiment, the processed product of tea may be those obtained by filling processed tea particles into a capsule or a packet in the form of a stick or those further processed into the form of a foaming tablet or a dispersible tablet.

The processed product of tea according to the present disclosure may be composed of 100% of tea powders without any binder, etc. Conventional fine granules or granules are manufactured by spraying onto tea powders a solution in which a binder is dissolved in water, and thus have a thick color or leave an unpleasant aftertaste when dispersed or dissolved in water. In contrast, the processed product of tea according to the present disclosure not only excludes the elements that negatively affect palatability, but also has remarkably enhanced dispersibility in a solvent, for example, water. Further, it does not comprise a binder, etc. and thus can allow to simplify the process and improve palatability.

In one exemplary embodiment, the manufacturing method may be manufacturing tea particles by spraying water onto tea powders.

In one exemplary embodiment, the manufacturing method may comprise the steps of: placing tea powders on the rotor disc and rotating the rotor disc; supplying air to levitate the tea powders; and spraying water onto the levitated tea powders to bring the tea powders into contact with water.

In one exemplary embodiment, the manufacturing method may be rotating the rotor disc to apply a centrifugal force to the tea powders.

In one exemplary embodiment, the manufacturing method may comprise the step of dropping by gravity the tea powders contacted with water.

In one exemplary embodiment, the manufacturing method may be spraying onto the tea powders water in an amount 0.3 to 1.5 times the total weight of the tea powders.

In one exemplary embodiment, the manufacturing method may further comprise the step of removing fine powders having a particle diameter of 75 μm or less.

A fluid-bed granulator is a device generally used for making powders or granules from liquids, granulating powders, coating drug ingredients, etc, and is mainly used for manufacturing food or pharmaceuticals. The general operation mechanism of the fluid-bed granulator is that granules of a designed composition ratio are manufactured in a fluid-bed in which liquids, powders, and granules are fluidized by air pressure. As used herein, the fluid-bed rotor granulator is a fluid-bed granulator comprising a rotary rotor disc, and a centrifugal force may be applied to the tea powders by the rotation of the rotor disc.

In one exemplary embodiment, the fluid-bed rotor granulator may comprise a container; and a rotor disc formed within the container;

In one exemplary embodiment, the fluid-bed rotor granulator may comprise a container; a rotor disc formed within the container; a gap forming part for supplying air into the container; and a nozzle forming part for spraying water into the container.

In one exemplary embodiment, the gap forming part may be formed between the rotor disc and the container wall.

In one exemplary embodiment, the gap forming part may be formed such that air is supplied to the inside of the container and the top of the rotor disc.

In one exemplary embodiment, the gap forming part may be formed such that air is supplied in an upward direction.

In one exemplary embodiment, the nozzle forming part may be formed adjacent to the gap forming part or may be formed spaced apart from the gap forming part.

In one exemplary embodiment, the nozzle forming part may be formed such that water is sprayed into the container and to the top of the rotor disc.

In one exemplary embodiment, the nozzle forming part may be formed such that water is sprayed in an upward direction.

In one exemplary embodiment, the manufacturing method may be supplying air to the gap between the rotor disc and the container wall, and spraying water into the container through the spray nozzle to manufacture tea particles. In one exemplary embodiment, the spray nozzle may be formed adjacent to or spaced apart from the gap for supplying air.

In one exemplary embodiment, the rotor disc may be formed in a horizontal direction.

In one exemplary embodiment, the speed of the rotor disc may be adjustable.

In one exemplary embodiment, the rotor disc may manufacture tea particles at a speed of 90 to 1,200 rpm. The rotation speed of the rotor disc may vary widely depending on the size of the device. For example, the rotor disc for laboratory devices, which has a small size (for example, the rotor disc of GPCG-1 from Glatt has a diameter of 30 cm), may be operated at a speed in the range of about 360 to 1200 rpm when manufacturing tea particles, and the rotor disc for production devices having a size of 1,200 cm may be operated at a speed in the range of about 90 to 300 rpm.

In one exemplary embodiment, the rotor disc manufactures tea particles at a tip speed of 2 to 20 m/sec, 3 to 20 m/sec, 4 to 20 m/sec or 5 to 20 m/sec and thus has the effect of providing a processed product of tea with improved dispersibility and flowability.

In one exemplary embodiment, the fluid-bed rotor granulator may manufacture tea particles under one or more of the following conditions: an inlet air temperature of 15° C. to 40° C., an exhaust temperature of 10° C. to 35° C., a spray nozzle diameter of 1.0 to 2.0 mm, a spray pressure of 1.0 to 5.0 bar, and a drying temperature of 40° C. to 80° C.

In one exemplary embodiment, the fluid-bed rotor granulator may manufacture tea particles under one or more of the following conditions: an inlet air temperature of 25° C. to 35° C., an exhaust temperature of 15° C. to 30° C., a spray nozzle diameter of 1.0 to 2.0 mm, a spray pressure of 1.0 to 3.0 bar, and a drying temperature of 60° C. to 80° C.

In one exemplary embodiment, the fluid-bed rotor granulator may manufacture tea particles with an air supply of 150 to 2,000 m³/hr or 600 to 1,000 m³/hr, which can be appropriately adjusted depending on the size of the fluid-bed rotor granulator device.

As described above, the method for manufacturing a processed product of tea according to the present disclosure can manufacture tea particles using three types of forces: a centrifugal force caused by the rotation of the rotor disc, a levitation force caused by the inlet air passing through the gap between the rotor disc and the container wall; and gravity which makes materials drop onto the rotor disc.

Conventionally, powders having a particle diameter of 50 μm or less, which are too fine, has had a limitation in that the size of the manufactured particles are not as large as desired even after processed with a fluid-bed granulator. The method for manufacturing a processed product of tea according to the present disclosure allows to manufacture tea particles having a desired size for a short time of about 2 hours or less, even if particle diameters of the tea powders constituting 99% by weight or more are 75 μm or less. The processed product of tea manufactured by the manufacturing method has excellent dispersibility in water and has improved flowability of tea particles, so that it is easier to pack and use.

In one exemplary embodiment, the processed product of tea manufactured by the manufacturing method may have one or more of the following properties:
 a) the processed product of tea comprises 20% by weight or less of fine powders based on the total weight of the tea particles, the fine powders having a particle diameter of 75 μm or less;
 b) the tea particles have one or more of the following particle size distribution values i) to iii):
  i) a particle size distribution $D_{10}$ of 50 μm or more;
  ii) a particle size distribution $D_{50}$ of 100 μm or more; and
  iii) a particle size distribution $D_{90}$ of 200 μm or more,
  wherein, in the above i) to iii), $D_{10}$, $D_{50}$, and $D_{90}$ respectively refer to a particle diameter corresponding to cumulative size distribution at 10%, a median diameter and a particle diameter corresponding to cumulative size distribution at 90%;
 c) the average particle diameter of the total tea particles is 100 to 300 μm;
 d) the processed product of tea has an angle of repose of 35° or less; and
 e) the processed product of tea has a wetting time of 60 seconds or less when contacted with water.

Hereinafter, the technology disclosed in the present disclosure will be described in detail by way of examples. It will be apparent to those skilled in the art that these examples are for illustrative purposes only, and the scope of the present disclosure is not construed as being limited by these examples.

EXAMPLE 1

600 g of powdered green tea (O'sulloc Farm, Republic of Korea) was put in a fluid-bed rotor granulator (GPCG-1, rotor type, Glatt, Germany) and a particulate processed product of tea comprising 20% by weight or less of fine powders having a particle diameter of 75 μm or less was manufactured by spraying 750 g of water under the conditions below. Also, those passed through the sieve of 30 mesh (600 pm) were used.

Inlet air temperature: 30° C., exhaust temperature: 23±5° C., nozzle's inside diameter: 1.0 mm, spray pressure: 1.0 bar, air flap: 25-30%, rotor rpm: 540 rpm, drying temperature: 70° C.

EXAMPLE 2

600 g of powdered green tea (O'sulloc Farm, Republic of Korea) was put in a fluid-bed rotor granulator (GPCG-1, rotor type, Glatt, Germany) and a particulate processed product of tea comprising 20% by weight or less of fine powders having a particle diameter of 75 μm or less was manufactured by spraying 660 g of water under the conditions below. Also, those passed through the sieve of 30 mesh (600 μm) were used.

Inlet air temperature: 30° C., exhaust temperature: 23±5° C., nozzle's inside diameter: 1.0 mm, spray pressure: 1.0 bar, air flap: 25-30%, rotor rpm: 540 rpm, drying temperature: 70° C.

EXAMPLE 3

600 g of powdered green tea (O'sulloc Farm, Republic of Korea) was put in a fluid-bed rotor granulator (GPCG-1, rotor type, Glatt, Germany) and a particulate processed product of tea comprising 20% by weight or less of fine powders having a particle diameter of 75 μm or less was manufactured by spraying 600 g of water under the conditions below. Also, those passed through the sieve of 30 mesh (600 μm) were used.

Inlet air temperature: 30° C., exhaust temperature: 23±5° C., nozzle's inside diameter: 1.0 mm, spray pressure: 1.0 bar, air flap: 25-30%, rotor rpm: 720 rpm, drying temperature: 70° C.

EXAMPLE 4

600 g of powdered green tea (O'sulloc Farm, Republic of Korea) was put in a fluid-bed rotor granulator (GPCG-1, rotor type, Glatt, Germany) and a particulate processed product of tea comprising 20% by weight or less of fine powders having a particle diameter of 75 μm or less was manufactured by spraying 500 g of water under the conditions below. Also, those passed through the sieve of 30 mesh (600 μm) were used.

Inlet air temperature: 30° C., exhaust temperature: 23±5° C., nozzle's inside diameter: 1.0 mm, spray pressure: 1.0 bar, air flap: 25-30%, rotor rpm: 360 rpm, drying temperature: 50° C.

EXAMPLE 5

600 g of powdered green tea (O'sulloc Farm, Republic of Korea) was put in a fluid-bed rotor granulator (GPCG-1, rotor type, Glatt, Germany) and a particulate processed product of tea comprising 20% by weight or less of fine powders having a particle diameter of 75 μm or less was manufactured by spraying 600 g of water under the conditions below. Also, those passed through the sieve of 30 mesh (600 μm) were used.

Inlet air temperature: 30° C., exhaust temperature: 23±5° C., nozzle's inside diameter: 1.0 mm, spray pressure: 1.0 bar, air flap: 25-30%, rotor rpm: 720 rpm, drying temperature: 65° C.

EXAMPLE 6

600 g of powdered green tea (O'sulloc Farm, Republic of Korea) was put in a fluid-bed rotor granulator (GPCG-1, rotor type, Glatt, Germany) and a particulate processed product of tea comprising 20% by weight or less of fine powders having a particle diameter of 75 μm or less was manufactured by spraying 700 g of water under the conditions below. Also, those passed through the sieve of 30 mesh (600 μm) were used.

Inlet air temperature: 30° C., exhaust temperature: 23±5° C., nozzle's inside diameter: 1.0 mm, spray pressure: 1.0 bar, air flap: 23-28%, rotor rpm: 360 rpm, drying temperature: 80° C.

EXAMPLE 7

40 kg of powdered green tea (O'sulloc Farm, Republic of Korea) was put in a fluid-bed rotor granulator (WBF200/120/100, rotor type, Enger, China) and a particulate processed product of tea comprising 20% by weight or less of fine powders having a particle diameter of 75 μm or less was manufactured by spraying 34 kg of water under the conditions below. Also, those passed through the sieve of 30 mesh (600 μm) were used.

Inlet air temperature: 23° C., exhaust temperature: 23±5° C., nozzle's inside diameter: 1.5 mm, spray pressure: 3.0 bar, air supply: 800 m³/hr, rotor rpm: 240 rpm, drying temperature: 70° C.

Comparative Example 1

500 g of powdered green tea (O'sulloc Farm, Republic of Korea) was put in a fluid-bed top spray granulator (GPCG-1, top spray type, Glatt, Germany) and a particulate processed product of tea was manufactured by spraying 300 g of water under the conditions below. Also, those passed through the sieve of 30 mesh (600 pm) were used.

Inlet air temperature: 30° C., exhaust temperature: 23±5° C., nozzle's inside diameter: 1.0 mm, spray pressure: 1.0 bar, air flap: 25-30%, drying temperature: 70° C.

Comparative Example 2

475 g of powdered green tea (O'sulloc Farm, Republic of Korea) was put in a fluid-bed top spray granulator (GPCG-1, top spray type, Glatt, Germany) and a particulate processed product of tea was manufactured by spraying a solution in which 25 g of maltitol was dissolved in 485 g of water, under the conditions below. Also, those passed through the sieve of 30 mesh (600 μm) were used.

Inlet air temperature: 50° C., exhaust temperature: 27±5° C., nozzle's inside diameter: 1.0 mm, spray pressure: 1.0 bar, air flap: 25-30%, drying temperature: 70° C.

Comparative Example 3

A mixture of 350 g of powdered green tea (O'sulloc Farm, Republic of Korea) and 125 g of mannitol was put in a fluid-bed top spray granulator (GPCG-1, top spray type, Glatt, Germany) and a particulate processed product of tea was manufactured by spraying a solution in which 25 g of maltitol was dissolved in 525 g of water, under the conditions below. Also, those passed through the sieve of 30 mesh (600 μm) were used.

Inlet air temperature: 50° C., exhaust temperature: 25±5° C., nozzle's inside diameter: 1.0 mm, spray pressure: 1.0 bar, air flap: 25-30%, drying temperature: 70° C.

Comparative Example 4

495 g of powdered green tea (O'sulloc Farm, Republic of Korea) was put in a fluid-bed top spray granulator (GPCG-1, top spray type, Glatt, Germany) and a particulate processed product of tea was manufactured by spraying a solution in which 5 g of maltodextrin was dissolved in 295 g of water, under the conditions below. Also, those passed through the sieve of 30 mesh (600 μm) were used.

Inlet air temperature: 60° C., exhaust temperature: 30±5° C., nozzle's inside diameter: 1.0 mm, spray pressure: 1.0 bar, air flap: 25-30%, drying temperature: 70° C.

Comparative Example 5

Commercially available powdered green tea (O'sulloc Farm, Republic of Korea) was designated as Comparative Example 5 and used in the following test examples.

Comparative Example 6

Commercially available Rishi matcha (Rishi Matcha Travel Packs, Rishi-Tea) was designated as Comparative Example 6 and used in the following test examples.

Comparative Example 7

Commercially available Encha organic matcha (Encha organic matcha green tea powder packets, Encha) was designated as Comparative Example 7 and used in the following test examples.

Comparative Example 8

Crystalline cellulose which is a commercially available crystalline powder (Avicel PH200, Dupont, USA) was designated as Comparative Example 8 and used in the following test examples. The crystalline cellulose used in Comparative Example 8 was found to have 9.29% of fine powders having a particle diameter of 75 μm or less as measured by a particle size analyzer (Mastersizer, Malvern, UK).

Test Example 1: Particle Size Analysis

A particle size analyzer (Mastersizer, Malvern, UK) was used to measure the particle size distribution, average particle size, the ratio of particles having a specific range of particle size (75 μm or less) of Examples 1 to 7 and Comparative Examples 1 to 7. The results are shown in Table 1.

Test Example 2: Measurement of Wetting Time 1.5 g of each of the samples of Examples 1 to 7 and Comparative Examples 1 to 7 were carefully placed in a beaker containing 500 mL of water at the same temperature as the room temperature. Then, the wetting time, which is the time it takes for the sample to sink below water surface without agglomeration on the surface, was measured. The results are shown in Table 1 and FIG. 1 to FIG. 8. The wetting time is the time measured when all of the samples sank below water surface after they were left without application of a physical force such as stirring or shaking.

Test Example 3: Measurement of Angle of Repose

Samples of Examples 1 to 7 and Comparative Examples 1 to 7 were placed in a funnel through which powders were to be passed, with the funnel fixed to the bottom surface. Then, the funnel was gradually raised to form a pile in the form of a cone. The average of the diameters at four points of the cone and the height of the cone were measured, and then the angle of repose was determined from the equation below. The results are shown in Table 1.

tan α=height/(0.5×base diameter)

The angle of repose is an index indicating the fluidity (flowability) of particles. Generally, 25° to 30° means very good, 31° to 35° means good and 36° to 40° means slightly good. When the fluidity is excellent, the desired amount of particles are filled in a capsule or a stick pack or are tabletted into a tablet, thus facilitating the process.

Test Results

TABLE 1

| Test sample | Particle size distribution (μm) | | | Average diameter (D [4.3], μm) | Ratio of fine powders (75 μm ≥) (%) | Angle of repose (°) | Wetting time (sec) |
|---|---|---|---|---|---|---|---|
| | $D_{10}$ | $D_{50}$ | $D_{90}$ | | | | |
| Example 1 | 153 | 231 | 294 | 226 | 1.0 | 27.8 | 9 |
| Example 2 | 136 | 219 | 287 | 213 | 1.8 | 28.4 | 13 |
| Example 3 | 130 | 201 | 310 | 230 | 0.0 | 26.7 | 11 |
| Example 4 | 60 | 148 | 264 | 157 | 14.5 | 26.0 | 23 |
| Example 5 | 76 | 128 | 204 | 134 | 9.6 | 27.8 | 44 |
| Example 6 | 120 | 185 | 282 | 194 | 0.1 | 24.9 | 8 |
| Example 7 | 92 | 216 | 603 | 294 | 4.0 | 25.6 | 16 |
| Comparative Example 1 | 22 | 83 | 173 | 92 | 44.6 | 35.3 | 180< |
| Comparative Example 2 | 18 | 42 | 84 | 49 | 85.6 | 35.4 | 180< |
| Comparative Example 3 | 23 | 52 | 102 | 58 | 74.7 | 33.6 | 180< |
| Comparative Example 4 | 17 | 42 | 84 | 48 | 85.5 | 34.9 | 180< |
| Comparative Example 5 | 4 | 16 | 43 | 20 | 94.7 | 55.5 | 180< |
| Comparative Example 6 | 2 | 8 | 27 | 12 | 99.8 | 54.1 | 180< |
| Comparative Example 7 | 2 | 7 | 20 | 9 | 100.0 | 52.7 | 180< |

Figure 9:
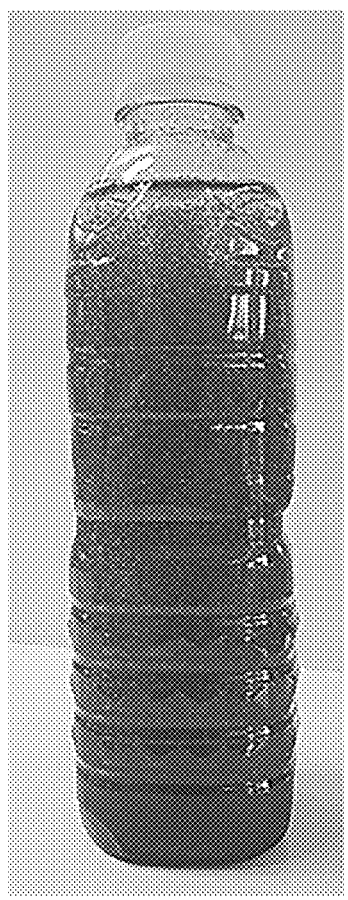
FIG. 9 is a photograph showing the visual observation of the sample of Example 3 in a water bottle containing 500 mL of water, after inverting it once in a vertical direction.
Figure 10:
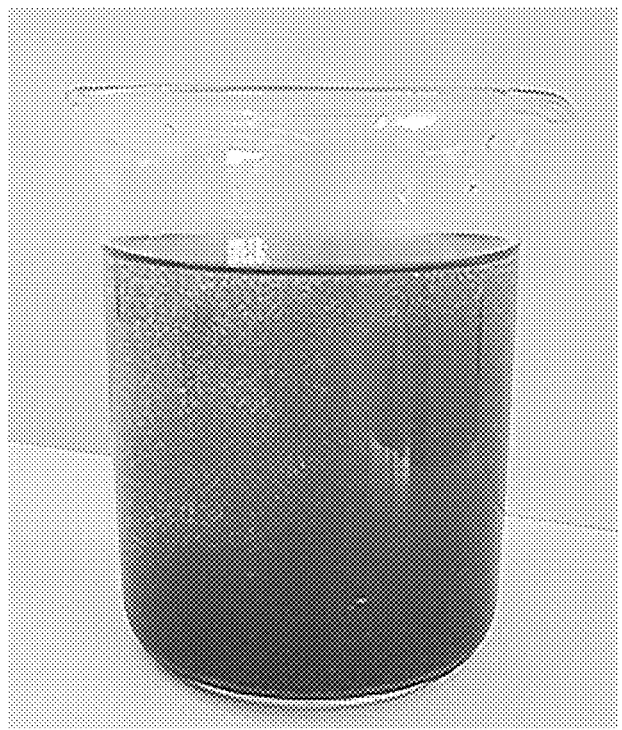
FIG. 10 is a photograph showing the visual observation of the sample of Example 3, after putting it into a beaker containing 500 mL of water and then stirring it once.

$D_{10}$: particle diameter corresponding to cumulative size distribution at 10%
$D_{50}$: median diameter (that is, the particle diameter at the point where the particle fraction constitutes 50%)
$D_{90}$: particle diameter corresponding to cumulative size distribution at 90%.
$D_{4.3}$: average diameter calculated from particle volume From Test Examples 1 and 2, it was found that Examples 1 to 7, which have a much lower ratio of fine powders with a particle diameter of 75 μm or less than Comparative Examples 1 to 7, had a significantly short wetting time compared to the wetting time of Comparative Examples 1 to 7, which exceeded 180 seconds. The rate of dispersion of the processed products of tea according to the present disclosure in a solvent (for example, water) was remarkably superior to powdered green tea or conventional powdered green tea granules. Actually, when the processed products of tea according to the present disclosure were placed in a cup, a tumbler or a water bottle, etc., they were easily dispersed in water and thus could be conveniently used (see FIG. 9 and FIG. 10).

Comparative Examples 2 to 4, in which the processed products of tea were manufactured with addition of maltitol or maltodextrin according to a conventional method in order to improve dispersibility, also had a high wetting time, and thus could not achieve the desired effect. Specifically, Comparative Examples 2 to 4 were not wetted at all during the wetting time measurement (3 minutes), leaving a significant amount on the water surface. Also, when they were placed in a water bottle and then shaken, the processed products of tea were left around the opening of the water bottle, showing that they had significantly low wettability.

Figure 4:
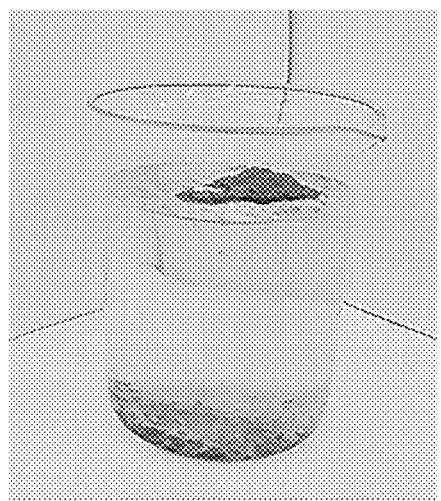
FIG. 4 to FIG. 8 respectively are photographs showing the visual observation of the samples of Comparative Examples 1 and 4 to 7 dispersed in water when 3 minutes have elapsed after the samples were put in water according to a test example of the present disclosure. Even after 3 minutes, the samples of Comparative Examples 1 and 4 to 7 were not wetted and a significant amount remained on the water surface.
Figure 5:
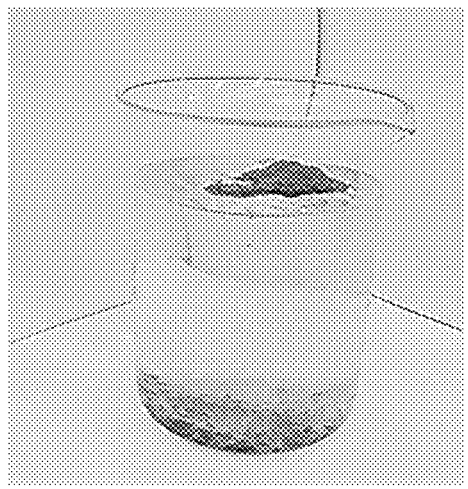
Figure 6:
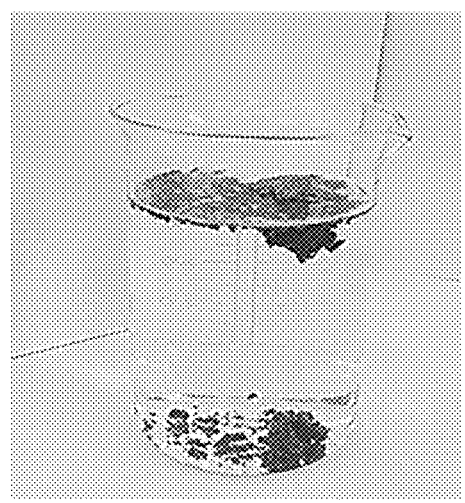
Figure 7:
Figure 8:

Upon comparing wetting time between Comparative Example 1, which had a low ratio of fine powders (44.6%) among the comparative examples and Example 4, which had a high ratio of fine powders (14.5%) among the examples, Example 4 exhibited a wetting time of 23 seconds, whereas Comparative Example 1 was not wetted at all during the wetting time measurement (3 minutes), leaving a significant amount on the water surface (see FIG. 4).

Also, even if wetted, powdered green tea or powdered green tea granules that have sunk may not be dispersed well but agglomerate. However, it was found that the processed products of tea according to the present disclosure had very excellent dispersibility, and thus exhibited almost no agglomeration even when not stirred or shaken (see FIG. 1 to FIG. 3). In particular, although Example 4 had a relatively longer wetting time than Examples 2 and 3, from the photograph taken immediately after wetting time measurement, it was visually confirmed that the processed products of tea were dispersed well in water during wetting, and that the processed products of tea, which included insoluble materials, did not stick to or agglomerate with each other after dispersed in water, and thus had excellent redispersibility.

As described above, it was found that the processed products of tea according to the present disclosure, which comprise 20% by weight or less of fine powders having a particle diameter of 75 μm or less, can be composed of only tea powders without an additive such as a binder and had rapid dispersion properties. These dispersion properties were remarkably superior to Comparative Examples 1 to 7, which had a higher ratio of fine powders and a lower average particle diameter. Therefore, it was found that in particulate processed products of tea, the particle size and particle size distribution affect the dispersibility, and that smaller particle size of processed products of tea does not mean higher dispersibility.

From Test Example 3, it was found that Examples 1 to 7, which had a much lower ratio of fine powders with a particle diameter of 75 μm or less than Comparative Examples 1 to 7, had very good flowability, unlike Comparative Examples 1 to 7, which had an angle of repose exceeding 35°. Thus, it was found that the processed products of tea according to the present disclosure have very good fluidity and thus are easy to pack and use.

Figure 11:
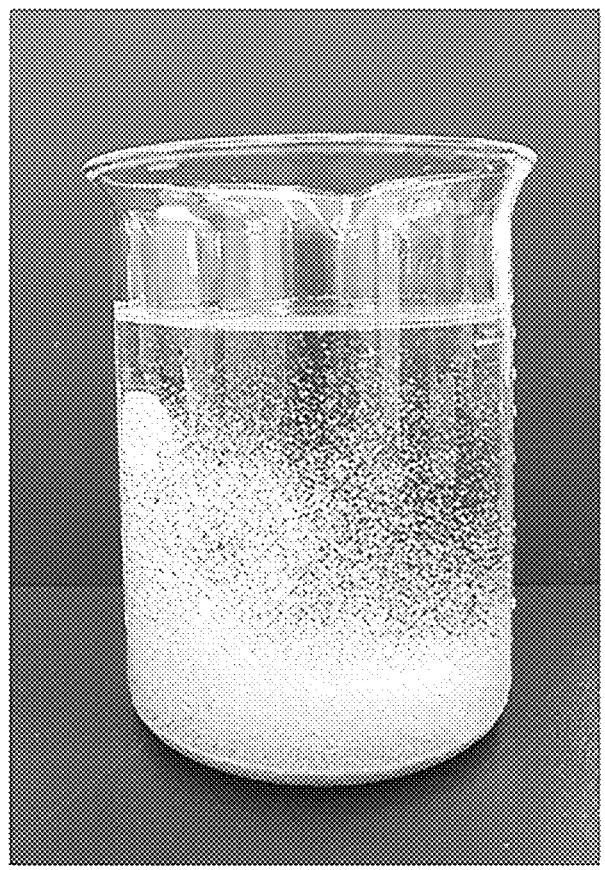
FIG. 11 is a photograph showing the visual observation of the dispersion state of the sample of Example 1, 20 minutes after putting 1.5 g of the sample into a beaker containing 500 mL of water according to a test example of the present disclosure.
Figure 12:
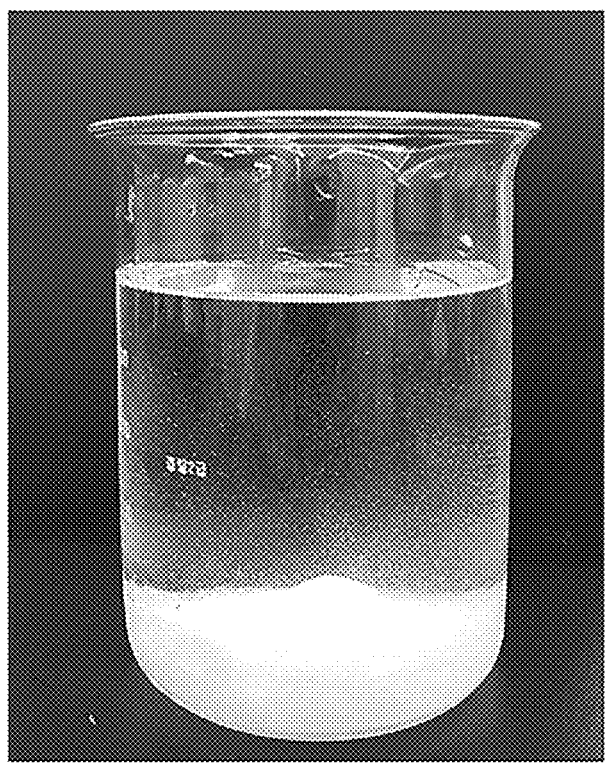
FIG. 12 is a photograph showing the visual observation of the dispersion state of the sample of Comparative Example 8, 20 minutes after putting 1.5 g of the sample into a beaker containing 500 mL of water according to a test example of the present disclosure.
Figure 13:
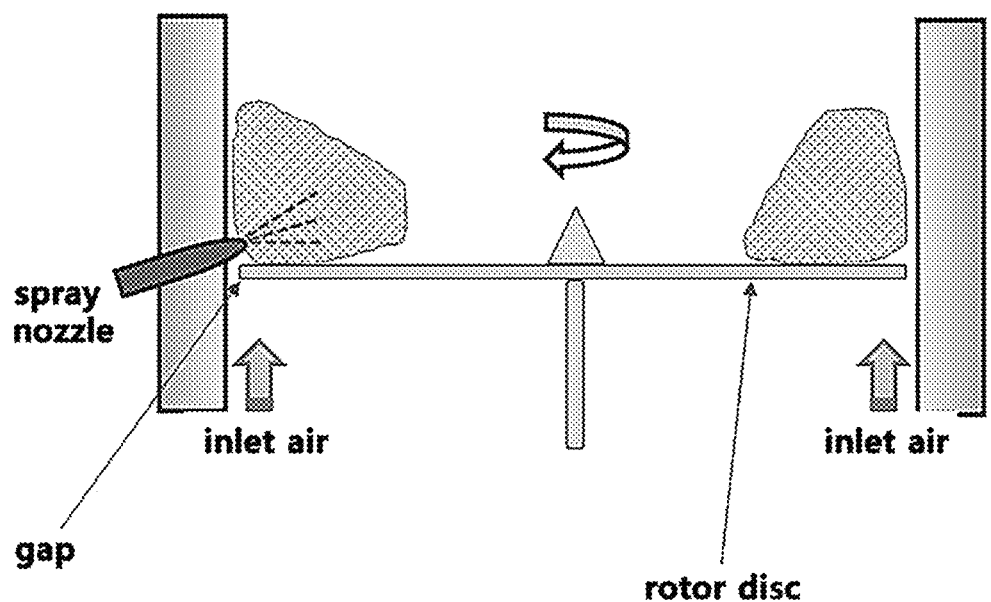
FIG. 13 is a schematic diagram of a fluid-bed rotor granulator according to an example of the present disclosure.

Further, when each of the samples of Example 1 and Comparative Example 8 were added to water under the same conditions, the processed products of tea of Example 1 were kept well dispersed in water even after 20 seconds, whereas the crystalline cellulose of Comparative Example 8 completely sank to the bottom after 20 seconds (see FIG. 11 and FIG. 12). As described above, the crystalline cellulose was found to have low dispersibility even though it had a low content of fine powders. Therefore, it was found that the ratio of fine powders and dispersion properties are not always in proportion to or in inverse proportion to each other, but the type of particles acts as a factor that influences the dispersion properties, and thus that even when the ratio of fine powders is low, the dispersion properties may vary depending on the type of particles.

While the present disclosure has been described with respect to the specific embodiments, it will be apparent to those skilled in the art that the above descriptions are only preferred embodiments and that the scope of the present disclosure is not limited thereto. Thus, the scope of the present disclosure should be defined by the appended claims and equivalents thereof.

What is claimed is:

1. A particulate processed product of tea,
wherein the particulate processed product of tea is a product processed from a material consisting of tea powders and water,
the particulate processed product of tea comprises 20% by weight or less of fine powders based on the total weight of the particulate processed product of tea the tea particles, and the fine powders have a particle diameter of 75 μm or less.

2. The particulate processed product of tea according to claim 1,
wherein the tea is tea leaves.

3. The particulate processed product of tea according to claim 1,
wherein the tea is one or more selected from the group consisting of unfermented tea, semi-fermented tea, fermented tea and post-fermented tea.

4. The particulate processed product of tea according to claim 3,
wherein the tea is green tea.

5. The particulate processed product of tea according to claim 1,
wherein the processed product of tea comprises 15% by weight or less of fine powders based on the total weight of the particulate processed product of tea.

6. The particulate processed product of tea according to claim 1,
wherein the particulate processed product of tea has one or more of the following particle size distribution values i) to iii):
i) a particle size distribution $D_{10}$ of 50 μm or more;
ii) a particle size distribution $D_{50}$ of 100 μm or more; and
iii) a particle size distribution $D_{90}$ of 200 μm or more, and
wherein, in the above i) to iii), $D_{10}$, $D_{50}$, and $D_{90}$ respectively refer to a particle diameter corresponding to cumulative size distribution at 10%, a median diameter and a particle diameter corresponding to cumulative size distribution at 90%.

7. The particulate processed product of tea according to claim 6,
wherein the particle size distribution $D_{10}$ is 50 μm ≤$D_{10}$≤200 μm, the particle size distribution $D_{50}$ is 100 μm ≤$D_{50}$≤250 μm , and the particle size distribution $D_{90}$ is 200 μm ≤$D_{90}$≤600 μm .

8. The particulate processed product of tea according to claim 1,
wherein the average particle diameter of the particulate processed product of tea-is 100 to 300 μm .

9. The particulate processed product of tea according to claim 1,
wherein the processed product of tea has an angle of repose of 35° or less.

10. The particulate processed product of tea according to claim 1,
wherein the processed product of tea has a wetting time of 60 seconds or less when contacted with water.

11. The particulate processed product of tea according to claim 10,
wherein the wetting time is the time it takes for the whole processed product of tea to sink below water surface when 1.5 g of the processed product of tea is placed on the water surface.

12. The particulate processed product of tea according to claim 1,
wherein the processed product of tea has a formulation of powders or fine granules.

13. A method for manufacturing a particulate processed product of tea according to claim 1, comprising the step of manufacturing tea particles using a fluid-bed rotor granulator comprising a rotor disc.

14. The method for manufacturing a particulate processed product of tea according to claim 13,
wherein the manufacturing method comprises the steps of: placing tea powders on the rotor disc and rotating the rotor disc; supplying air to levitate the tea powders; and spraying water onto the levitated tea powders to bring the tea powders into contact with water.

15. The method for manufacturing a particulate processed product of tea according to claim 14,
wherein particle diameters of the tea powders constituting 99% by weight or more of the total weight of the tea powders are 75 μm or less.

16. The method for manufacturing s particulate processed product of tea according to claim 14,
wherein the manufacturing method is spraying onto the tea powders water in an amount of 0.3 to 1.5 times of the total weight of the tea powders.

17. The method for manufacturing s particulate processed product of tea according to claim 13,
wherein the fluid-bed rotor granulator comprises a container; a rotor disc formed within the container; a gap forming part for supplying air into the container; and a nozzle forming part for spraying water into the container.

18. The method for manufacturing a particulate processed product of tea according to claim 17,
wherein the rotor disc manufactures tea particles at a tip speed of 2 to 20 m/sec.

19. The method for manufacturing a particulate processed product of tea according to claim 17,
wherein the fluid-bed rotor granulator manufactures tea particles under one or more of the following conditions: an inlet air temperature of 15° C. to 40° C., an exhaust temperature of 10° C. to 35° C., a spray nozzle diameter of 1.0 to 2.0 mm, a spray pressure of 1.0 to 5.0 bar, and a drying temperature of 40° C. to 80° C.

20. The method for manufacturing a particulate processed product of tea according to claim 13,
wherein the processed product of tea manufactured by the manufacturing method has one or more of the following properties:
a) the processed product of tea comprises 15% by weight or less of fine powders based on the total weight of the particulate processed of tea, the fine powders having a particle diameter of 75 μm or less;
b) the particulate processed product of tea has have one or more of the following particle size distribution values i) to iii):
i) a particle size distribution $D_{10}$ of 50 μm or more;
ii) a particle size distribution $D_{50}$ of 100 μm or more; and
iii) a particle size distribution $D_{90}$ of 200 μm or more,
wherein, in the above i) to iii), $D_{10}$, $D_{50}$, and $D_{90}$ respectively refer to a particle diameter corresponding to cumulative size distribution at 10%, a median diameter and a particle diameter corresponding to cumulative size distribution at 90%;
c) the average particle diameter of the particulate processed product of tea is 100 to 300 μm ;
d) the processed product of tea has an angle of repose of 35° or less; and
e) the processed product of tea has a wetting time of 60 seconds or less when contacted with water.

* * * * *